Aug. 13, 1929.  J. A. JENSEN  1,724,878
VENT DEVICE
Filed Jan. 25, 1927  2 Sheets-Sheet 1
FIG. I.
FIG. II.
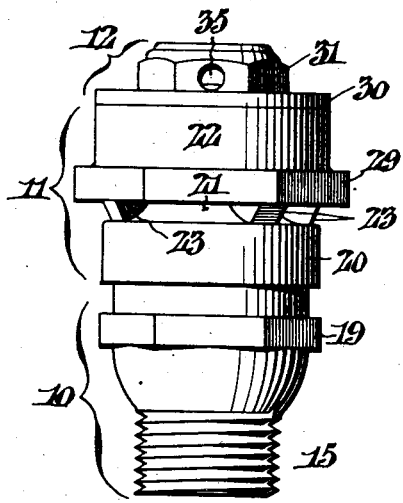
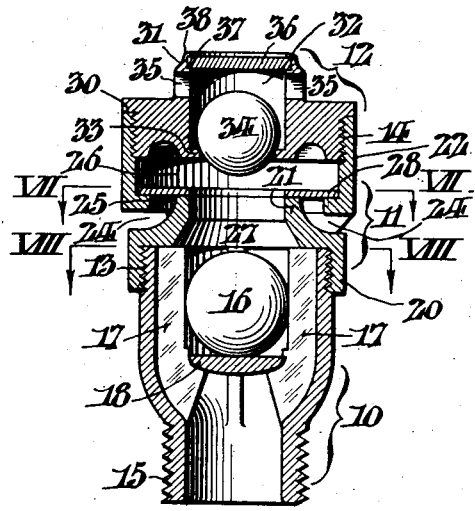
FIG. III.
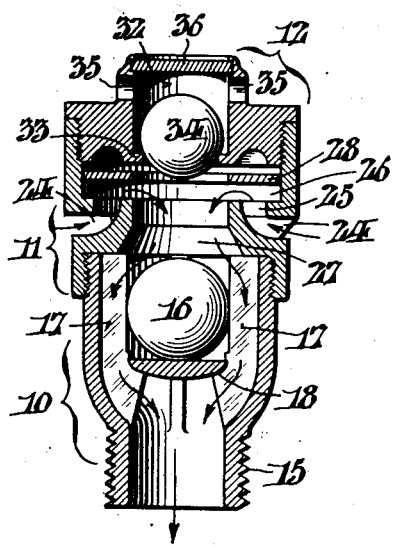
FIG. IV.
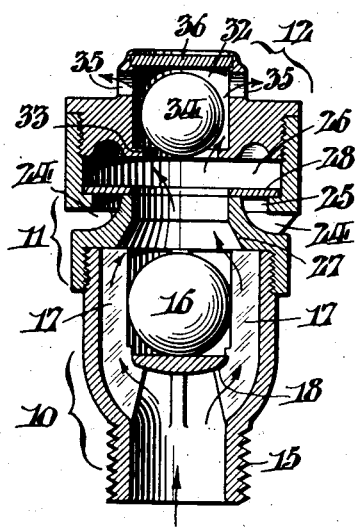
WITNESSES
John C. Bergner
John A. Weidler
INVENTOR:
James A. Jensen,
BY Haley & Paul
ATTORNEYS.

Aug. 13, 1929.  J. A. JENSEN  1,724,878
VENT DEVICE
Filed Jan. 25, 1927   2 Sheets-Sheet 2
FIG. VI.
FIG. V.
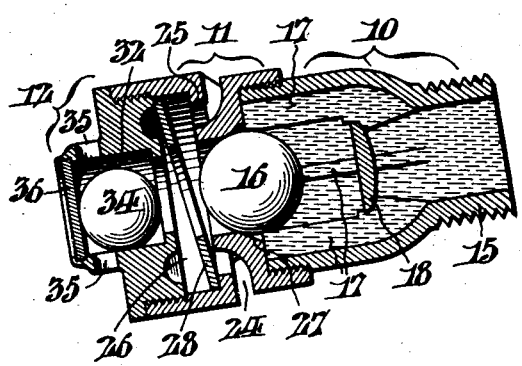
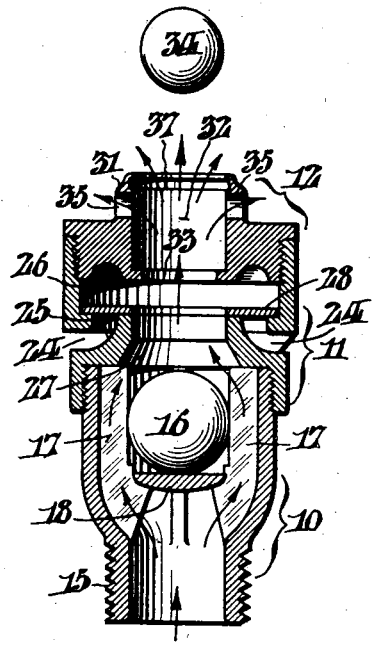
FIG. VII.
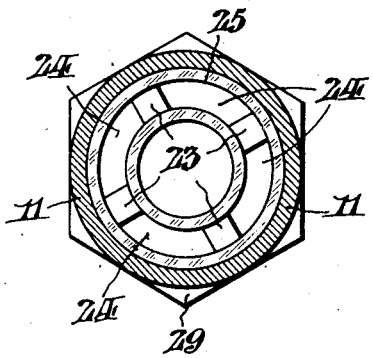
FIG. VIII.
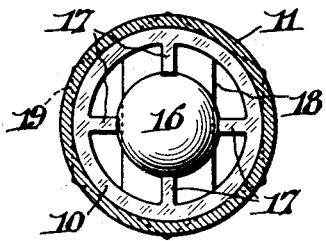
FIG. IX
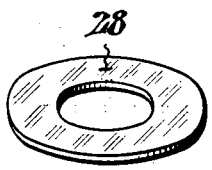
WITNESSES
John C. Bergman
John A. Weidler
INVENTOR:
James A. Jensen
BY Fraley Paul
ATTORNEYS.

Patented Aug. 13, 1929.

1,724,878

UNITED STATES PATENT OFFICE.

JAMES A. JENSEN, OF PHILADELPHIA, PENNSYLVANIA, ASSIGNOR TO QUAKER CITY IRON WORKS, OF PHILADELPHIA, PENNSYLVANIA, A CORPORATION OF PENNSYLVANIA.

VENT DEVICE.

Application filed January 25, 1927. Serial No. 163,338.

This invention relates to vent devices useful in connection with liquid receptacles, more particularly with tanks of vehicles employed in transporting liquid fuels, lubricating oils, etc. in bulk, from refining plants to retail distributing centers.

Considered from the broadest aspect, the aims of the present invention are to facilitate filling and emptying of the receptacles of the specific type mentioned so that the minimum amount of time is consumed for these operations; to normally prevent evaporation of the tank contents but at the same time insure against generation of dangerous pressures through gasification of volatile liquids occasioned as a result of subjection to high atmospheric temperatures or to turbulence incidental to transport; to safe-guard against the spilling of the contents in the event of upsetting or rolling over of the tanks; and, in case of fire, to afford the maximum relief of pressure from within the tanks for safety against explosions.

The foregoing attributes I seek to attain in a vent device which is self contained and of compact construction; absolutely reliable in operation; conducive to very economical manufacture; and composed of separable sections for ease of access to, and inspection of the movable parts within.

How the foregoing and other advantages may be readily realized in practice will be apparent from the detailed description which follows of the typical embodiment of the present invention shown in the drawings, whereof Fig. I is an elevation of my improved vent device.

Fig. II is an axial section of the same showing the movable parts in the positions which they normally occupy.

Figs. III, IV, V and VI are views similar to Fig. II showing the parts in positions assumed under different conditions of usage.

Fig. VII is a horizontal cross section of the device taken as indicated by the arrows VII—VII in Fig. II.

Fig. VIII is a similar section, but taken at a lower plane in accordance with the arrows VIII—VIII in Fig. II; and Fig. IX is a perspective view of one of the valve closures associated with the device.

As herein shown, the casing of my improved vent device is generally cylindric and composed of three axially-aligned sections 10, 11, 12, with screw thread junctures at 13 and 14 to facilitate assembling initially, as well as separation subsequently when access is required to the interior. The bottom section 10 is hollow and has its lower end or neck 15 threaded so as to be screwable into the aperture provided for its reception in the wall of a liquid storage receptacle or tank, not shown. A gravity-responsive spillprevention valve ball 16 is held to a central position within the hollow of the bottom casing section 10 by a number of integral inwardly-projecting radial guide ribs 17 of the latter, and normally reposes upon a transverse diametral web 18 joining said ribs near their lower ends with provision of passages totaling a cross sectional area equal to the opening in the neck 15 for free fluid flow around said web, as well as the ball 16 aforesaid. A narrow polygonal protuberance 19 about the bottom casing section 10 enables the use of a wrench in applying the device to a storage tank.

The intermediate casing section 11 has its lower portion 20 Fig. I axially recessed, as shown, to fit over the bottom casing section 10 at the threaded juncture 13, and thereabove is reduced as at 21 so as to be overhung by the upper portion 22 with which it is integrally joined by a series of radial webs 23 with formation of intervening lateral ports 24. These ports 24, it will be seen, serve as avenues of communication between the exterior and an annular opening 25 into the hollow 26, of the upper part 22, of the casing section 11. The reduced portion 21 of the intermediate casing section 11 (Figs. II and VII) is tubular and flared—as at 27—to afford a seat with which the valve ball 16 cooperates in the manner hereinafter explained. The ledges about the opening 25 within the hollow 26, are accurately ground to serve as a seat for an annular valve disk 28 (Fig. IX) having a central opening through it corresponding in diameter to that of the axial passage through the portion 21, of the casing section 11. The valve disk 28 controls influx of air through the ports 24 and in practice is made of very light material, preferably of thin sheet aluminum, so as to be sensitive to suction set up within the tank during withdrawal of its contents. Like the lower casing section 10, the intermediate section 11 has a polygonal protuberance 29 Fig. I convenient for wrench application.

The top casing section 12 is in the form of a cap and characterized by a circumferential stop shoulder 30 to abut against the top edge of the intermediate casing section 11. The central polygonal upward prolongation or head 31 of the casing section 12 has an axial cavity 32 corresponding in diameter to the orifice through the portion 21 of the intermediate casing section and the passage through the neck 15 of the bottom casing section 10, except for a slight inward projection at 33, which forms a seat for a pressure-responsive ball valve 34. The axial hollow 32, of the casing section 12, communicates with the exterior through a series of radial ports 35 in the sides of the head 31, and is closed at the top by a fusible disk 36 that rests upon an internal shoulder 37 of said head, and is retained through swedging over the metal at 38 incidental to initial assembling of the device to form a circumferentially-overlapping lip.

The normal position of the valves 16, 28, and 34 is shown in Fig. II from which it will be obvious that the device is closed against entry of the air from the exterior as well as against escape of vapor from the interior of the tank, the ball 34 being made to such weight in practice as to be unresponsive to pressures up to a predetermined point, thereby to prevent escape of evaporation under ordinary circumstances.

Fig. III shows the conditions obtaining when fluid is being drawn from the tank with which the device may be associated, the valve disk 28, by virtue of its lightness, yielding to being lifted off its seat under suction to permit entry of sufficient air via the ports 24 to displace the liquid drawn off. At this time the ball valves 16, 34 are of course obliged to remain in their normal positions.

Fig. IV shows the ball valve 34 raised from its seat as a result of pressure created by excessive evaporation within the tank, escape being by way of the ports 35 through the head 31 of the top casing section 12. In this connection, it is to be particularly observed that the transverse web 18 acts as a baffle to divert the fluid pressure flow to opposite sides around the spill prevention ball 16. As a consequence of being thus protected from the influence of the flow, and since the pressure around it is equalized in all directions, the ball 16 will remain as before, in its normal inactive position; while the valve disk 28 is held tightly to its seat by the pressure acting on its top at the time.

In Fig. V the device is shown in a tilted position such as would be assumed in the event of the tank rolling over or upsetting. In such a contingency it will be apparent that the ball 16 immediately rolls, under the action of gravity, along the guides 17 into contact with its seat 27 to prevent spill of the contents of the tank. The disk 28 and the ball 34 may also leave their respective seats, under the condition specified, but such action on their part is ineffective since all communication to the exterior is obviously interrupted through seating of the ball 16.

Fig. VI depicts—graphically—the conditions which would obtain in the event of fusion of the closure disk 36 by fire and the creation of pressure within the tank due to the action of the attending heat. Upon destruction of the disk 36, the ball 34 is freed and expelled from the hollow 32 of the top casing section 12 by the rush of vaporization under pressure from within the tank. It is to be particularly noted in this connection that, by virtue of the continuous stream-line and uni-directional axial outlet channel of substantially uniform cross sectional area accorded by the component casing sections 10, 11 and 12 the maximum relief is provided for escape of accumulated pressure from within the tank, thereby obviating the likelihood of explosion in the presence of fire.

From the foregoing it will be seen that I have provided a vent device capable of functioning automatically under various conditions of practice. In other words, it acts normally to prevent excessive evaporation of the liquid contents of a tank and yet is capable of relieving dangerous pressures due to changing of temperature etc., allows quick filling and emptying of the tanks, and affords instant relief for accumulated pressure in the event of fire.

Having thus described my invention, I claim:

1. A vent control device for combustible liquid storage receptacles comprising a casing affording a continuous uni-directional stream-line channel of substantially uniform cross sectional area throughout with seats at different levels for gravity-responsive spill-prevention, suction and pressure-responsive relief valves, said casing having circumferential air-inlet and pressure-outlet orifices at different levels, and the channel aforesaid being protected by a fusible closure permitting maximum pressure relief in the event of fire.

2. A vent control device for liquid storage receptacles comprising three separable axially-aligned casing sections, jointly affording a continuous uni-directional stream-line channel of substantially uniform cross sectional area with three valve seats at different levels, a gravity-responsive spill-prevention valve engageable on the lowermost seat but normally sustained away therefrom with provision for unimpeded pressure flow thereabout, a suction-responsive air inlet valve co-operative with the intermediate seat, and a pressure-responsive relief valve to control the upper seat.

3. A vent control device for liquid storage receptacles comprising three separable axially-aligned casing sections jointly affording a continuous uni-directional stream-line channel of substantially uniform cross sectional area with three valve seats at different levels, a gravity-responsive spill-prevention valve co-operative with the lowermost seat and normally sustained in a position to divert pressure flow thereabout, a suction-responsive valve to cooperate with the intermediate seat in controlling influx of air through a series of lateral ports in the casing, and a pressure-responsive relief valve cooperating with the uppermost seat to control pressure discharge through a separate series of lateral ports.

4. A vent control device for combustible liquid storage receptacles comprising three separable axially-aligned casing sections jointly affording a continuous uni-directional stream-line channel of substantially uniform cross sectional area with three valve seats at different levels, a gravity-influenced spill prevention valve controlling the lowermost seat and normally reposing on a diametrical web with provision for pressure flow thereabout, a suction-responsive valve to cooperate with the intermediate seat in controlling influx of air through a series of lateral ports in the casing, a pressure-responsive valve cooperating with the uppermost seat section to control discharge of pressure through a series of radial ports in that casing section, and a fusible disk closing the end of the channel in the latter casing section permitting maximum pressure relief in the event of fire.

5. A vent control device for liquid storage tanks comprising a casing, and a gravity-influenced valve adapted, upon inversion of the device, to close an outlet port in the casing to prevent spilling of the tank contents, said valve normally resting centrally on a transverse web within the casing operative as a baffle to normally direct the pressure flow around the valve en route to the outlet port aforesaid.

6. A vent control device for liquid storage tanks comprising a cylindric casing, a gravity-influenced ball valve held to a central position within the casing by inwardly-projecting radial guide ribs of the latter, and adapted, upon inversion of the device, to close an axial outlet port to prevent spilling of the tank contents, said valve normally resting on a diametral web within the casing operative as a baffle to normally divert pressure flow around the valve en route to the outlet port aforesaid.

In testimony whereof, I have hereunto signed my name at Philadelphia, Pennsylvania, this 14th day of January, 1927.

JAMES A. JENSEN.